(12) United States Patent
Chen et al.

(10) Patent No.: US 9,262,941 B2
(45) Date of Patent: Feb. 16, 2016

(54) SYSTEMS AND METHODS FOR ASSESSMENT OF NON-NATIVE SPEECH USING VOWEL SPACE CHARACTERISTICS

(75) Inventors: Lei Chen, Lawrenceville, NJ (US); Keelan Evanini, Pennington, NJ (US); Xie Sun, Florham Park, NJ (US)

(73) Assignee: Educational Testing Services, Princeton, NJ (US)

( * ) Notice: Subject to any disclaimer, the term of this patent is extended or adjusted under 35 U.S.C. 154(b) by 220 days.

(21) Appl. No.: 13/182,770

(22) Filed: Jul. 14, 2011

(65) Prior Publication Data

US 2012/0016672 A1 Jan. 19, 2012

Related U.S. Application Data

(60) Provisional application No. 61/364,215, filed on Jul. 14, 2010.

(51) Int. Cl.

| | |
|---|---|
| *G10L 15/00* | (2013.01) |
| *G10L 19/06* | (2013.01) |
| *G10L 21/00* | (2013.01) |
| *G09B 19/04* | (2006.01) |
| *G10L 25/60* | (2013.01) |
| *G09B 19/06* | (2006.01) |
| *G10L 15/04* | (2013.01) |
| *G10L 25/27* | (2013.01) |
| *G10L 25/15* | (2013.01) |

(52) U.S. Cl.
CPC ............ *G09B 19/04* (2013.01); *G09B 19/06* (2013.01); *G10L 25/60* (2013.01); *G10L 15/04* (2013.01); *G10L 25/15* (2013.01); *G10L 25/27* (2013.01)

(58) Field of Classification Search
USPC ........................................ 704/236
See application file for complete search history.

(56) References Cited

U.S. PATENT DOCUMENTS

| | | | | |
|---|---|---|---|---|
| 4,710,877 | A | * | 12/1987 | Ahmed ........................ 704/1 |
| 4,924,518 | A | * | 5/1990 | Ukita ........................ 704/239 |
| 5,165,008 | A | * | 11/1992 | Hermansky et al. ........... 704/262 |
| 5,634,086 | A | * | 5/1997 | Rtischev et al. ............... 704/270 |
| 5,799,276 | A | * | 8/1998 | Komissarchik et al. ....... 704/251 |
| 6,662,162 | B2 | * | 12/2003 | Casper ........................ 704/271 |
| 6,704,708 | B1 | * | 3/2004 | Pickering .................... 704/235 |
| 7,069,217 | B2 | * | 6/2006 | McLaughlin et al. ........ 704/269 |
| 7,217,134 | B2 | * | 5/2007 | Hansen et al. ............... 434/322 |
| 8,209,173 | B2 | * | 6/2012 | Bejar et al. .................. 704/243 |
| 8,275,619 | B2 | * | 9/2012 | Herbig et al. ................. 704/251 |
| 8,306,824 | B2 | * | 11/2012 | Park .......................... 704/270 |

(Continued)

OTHER PUBLICATIONS

Neel, Amy T., Vowel Space Characteristics and Vowel Identification Accuracy, Jun. 2008, American Speech-Language-Hearing Association, vol. 51, pp. 574-585.*

(Continued)

*Primary Examiner* — Timothy Nguyen
(74) *Attorney, Agent, or Firm* — Jones Day

(57) ABSTRACT

Computer-implemented systems and methods are provided for assessing non-native speech proficiency. A non-native speech sample is processed to identify a plurality of vowel sound boundaries in the non-native speech sample. Portions of the non-native speech sample are analyzed within the vowel sound boundaries to extract vowel characteristics. The vowel characteristics are used to identify a plurality of vowel space metrics for the non-native speech sample, and the vowel space metrics are used to determine a non-native speech proficiency score for the non-native speech sample.

44 Claims, 10 Drawing Sheets

(56) References Cited

U.S. PATENT DOCUMENTS

| | | | |
|---|---|---|---|
| 8,392,190 B2* | 3/2013 | Chen et al. | 704/256.1 |
| 2002/0087314 A1* | 7/2002 | Fischer et al. | 704/255 |
| 2003/0158721 A1* | 8/2003 | Kato et al. | 704/1 |
| 2006/0004567 A1* | 1/2006 | Russell | 704/209 |
| 2006/0074655 A1* | 4/2006 | Bejar et al. | 704/243 |
| 2006/0190257 A1* | 8/2006 | Forbes et al. | 704/255 |
| 2008/0147404 A1* | 6/2008 | Liu et al. | 704/256.2 |
| 2008/0162134 A1* | 7/2008 | Forbes et al. | 704/241 |
| 2008/0259085 A1* | 10/2008 | Chen et al. | 345/473 |
| 2009/0119105 A1* | 5/2009 | Kim et al. | 704/244 |
| 2009/0258333 A1* | 10/2009 | Yu | 434/157 |
| 2010/0145698 A1 | 6/2010 | Chen et al. | |
| 2012/0016672 A1* | 1/2012 | Chen et al. | 704/236 |
| 2012/0022391 A1* | 1/2012 | Leuthardt | 600/544 |
| 2012/0035917 A1* | 2/2012 | Kim et al. | 704/200.1 |
| 2012/0275722 A1* | 11/2012 | Yang | 382/294 |
| 2012/0323573 A1* | 12/2012 | Yoon et al. | 704/236 |
| 2013/0030808 A1* | 1/2013 | Zechner et al. | 704/236 |

OTHER PUBLICATIONS

Bradlow et al., Intelligibility of normal speech I: Golobal and fine-grained acoustic-phonetic talker characteristics, 1996, Elsevier Science, pp. 255-272.*

Boersma, Paul, Weenick, David; Praat: Doing Phonetics by Computer; http://www.praat.org; 2011.

Bradlow, Ann, Torretta, Gina, Pisoni, David; Intelligibility of Normal Speech I: Global and Fine-Grained Acoustic-Phonetic Talker Characteristics; Speech Communication, 20(3-4); pp. 255-272; 1996.

Chen, Lei, Zechner, Klaus, Xi, Xiaoming; Improved Pronunciation Features for Construct-Driven Assessment of Non-Native Spontaneous Speech; NAACL; pp. 442-449; 2009.

Cucchiarini, Catia, Strik, Helmer, Boves, Lou; Automatic Evaluation of Dutch Pronunciation by Using Speech Recognition Technology; Department of Language & Speech, Nijmegen University, The Netherlands; IEEE Automatic Speech Recognition and Understanding Workshop; 1997.

Cucchiarini, Catia, Strik, Helmer, Boves, Lou; Usiing Speech Recognition Technology to Assess Foreign Speakers' Pronunciation of Dutch; University of Nijmegen; 3rd International Symposium on the Acquisition of Second Language Speech; Klagenfurt, Austria; 1997.

Flege, James, Bohn, Ocke-Schwen, Jang, Sunyoung; Effects of Experience on Non-Native Speakers' Production and Perception of English Vowels; Journal of Phonetics, 25(4); pp. 437-470; 1997.

Franco, Horacio, Abrash, Victor, Precoda, Kristin, Bratt, Harry, Rao, Ramana, Butzberger, John, Rossier, Romain, Cesari, Federico; The SRI EduSpeak System: Recognition and Pronunciation Scoring for Language Learning; Speech Technology and Research Laboratory, SRI International; Menlo Park, CA; 2000.

Graff, David; The 1996 Broadcast News Speech and Language-Model Corpus; Linguistic Data Consortium; University of Pennsylvania; 1996.

Hacker, Christian, Cincarek, Tobias, Gruhn, Rainer, Steidl, Stefan, Noth, Elmar, Niemann, Heinrich; Pronunciation Feature Extraction; Proceedings of DAGM; pp. 141-148; 2005.

Labov, William, Ash, Sharon, Boberg, Charles (Eds.); The Atlas of North American English: Phonetics, Phonology and Sound Change; Mouton de Gruyter; 2006.

Li, Herman Chi Nin, So, Connie; Acoustic Analysis of Vowels Spoken Clearly and Conversationally by Non-Native English Speakers; Proceedings of the 11th Australian International Conference on Speech Science and Technology; pp. 444-448; 2006.

Mildner, Vesna, Tomic, Diana; Effects of Phonetic Speech Training on the Pronunciation of Vowels in a Foreign Language; Proc. ICPhS; pp. 1665-1668; 2007.

Minematsu, Nobuaki, Asakawa, Satoshi, Hirose, Keikichi; Structural Representation of the Pronunciation and Its Use for Call; IEEE, Spoken Language Technology Workshop; pp. 126-129; 2006.

Mostow, Jack, Roth, Steven, Hauptmann, Alexander, Kane, Matthew; A Prototype Reading Coach That Listens; Proceedings of AAAI; pp. 785-792; 1994.

Moustroufas, N., Digalakis, Vassilios; Automatic Pronunciation Evaluation of Foreign Speakers Using Unknown Text; Computer Speech & Language, 21(1); pp. 219-230; 2007.

Neumeyer, Leonardo, Franco, Horatio, Digalakis, Vassilios, Weintraub, Mitchel; Automatic Scoring of Pronunciation Quality; Speech Communication, 30; pp. 83-93; 2000.

PhonePass Testing: Structure and Construct; Ordinate Corporation Technical Report; 1999.

Picheny, M.; Durlach, N., Braida, L.; Speaking Clearly for the Hard of Hearing II: Acoustic Characteristics of Clear and Conversational Speech; Journal of Speech and Hearing Research, 29; pp. 434-446; 1986.

Scarborough, Rebecca, Brenier, Jason, Zhao, Yuan, Hall-Lew, Lauren, Dmitrieva, Olga; An Acoustic Study of Real and Imagined Foreigner-Directed Speech; Proc. of ICPhS; 2007.

Wik, Preben, Escribano, David; Say 'Aaaaa': Interactive Vowel Practice for Second Language Learning; Proc. SLaTE; 2009.

Witt, Silke Maren; Use of Speech Recognition in Computer-Assisted Language Learning; PhD Thesis, Newnham College, University of Cambridge; 1999.

Yuan, Jiahong, Liberman, Mark; Speaker Identification on the Scotus Corpus; Proc. of Acoustics '08; 2008.

Zechner, Klaus, Bejar, Isaac; Towards Automatic Scoring of Non-Native Spontaneous Speech; Proceedings of the Human Language Technology Conference, North American Chapter of the ACL; pp. 216-223; 2006.

Zechner, Klaus, Higgins, Derrick, Xi, Xiaoming; SpeechRater: A Construct-Driven Approach to Scoring Spontaneous Non-Native Speech; Proc. SLaTE; 2007.

* cited by examiner

| Vowel | Word Tokens |
|---|---|
| IY | each, needs, week |
| AA | projects, quality, want |
| OW | located, open, over |

FIG. 4

SYSTEMS AND METHODS FOR ASSESSMENT OF NON-NATIVE SPEECH USING VOWEL SPACE CHARACTERISTICS

This application claims priority to U.S. Provisional Application No. 61/364,215 filed on Jul. 14, 2010, entitled "Assessment of Non-native Speech Using Vowel Space Characteristics," the entirety of which is herein incorporated by reference.

FIELD

The technology described herein relates generally to spoken language proficiency testing and more specifically to spoken language pronunciation proficiency testing using vowel space characteristics.

BACKGROUND

It is often desirable to measure a person's ability to vocally communicate in a particular language. Such assessments may measure a person's ability to communicate in the native language of the person, or the assessments may measure the person's ability to speak a foreign language. Oftentimes, speech proficiency examinations are scored by one or more human scorers. For example, a person (examinee) may read a provided text aloud, and the one or more human scorers, who listen to the person's reading live or via a recording, provide a score representing a perceived ability of the examinee to communicate in the language being tested. The present inventors have recognized a need for improved automated systems for assessing non-native speech.

SUMMARY

In accordance with the teachings herein, computer-implemented systems and methods are provided for assessing non-native speech proficiency. A non-native speech sample is processed to identify a plurality of vowel sound boundaries in the non-native speech sample. Portions of the non-native speech sample are analyzed within the vowel sound boundaries to extract vowel characteristics. The vowel characteristics are used to identify a plurality of vowel space metrics for the non-native speech sample, and the vowel space metrics are used to determine a non-native speech proficiency score for the non-native speech sample.

As another example, a computer-implemented system for assessing non-native speech proficiency may include a processing system and a computer-readable memory programmed with instructions for causing the processing system to perform steps that include processing a non-native speech sample to identify a plurality of vowel sound boundaries in the non-native speech sample. Portions of the non-native speech sample are analyzed within the vowel sound boundaries to extract vowel characteristics. The vowel characteristics are used to identify a plurality of vowel space metrics for the non-native speech sample, and the vowel space metrics are used to determine a non-native speech proficiency score for the non-native speech sample.

As a further example, a non-transitory computer-readable storage medium comprises computer-readable instructions that when executed cause a processing system to perform steps that include processing a non-native speech sample to identify a plurality of vowel sound boundaries in the non-native speech sample. Portions of the non-native speech sample are analyzed within the vowel sound boundaries to extract vowel characteristics. The vowel characteristics are used to identify a plurality of vowel space metrics for the non-native speech sample, and the vowel space metrics are used to determine a non-native speech proficiency score for the non-native speech sample.

BRIEF DESCRIPTION OF THE DRAWINGS

FIG. 4 is a table depicting vowel sounds that may be considered by a non-native vowel space speech assessment engine.

DETAILED DESCRIPTION

Figure 1:
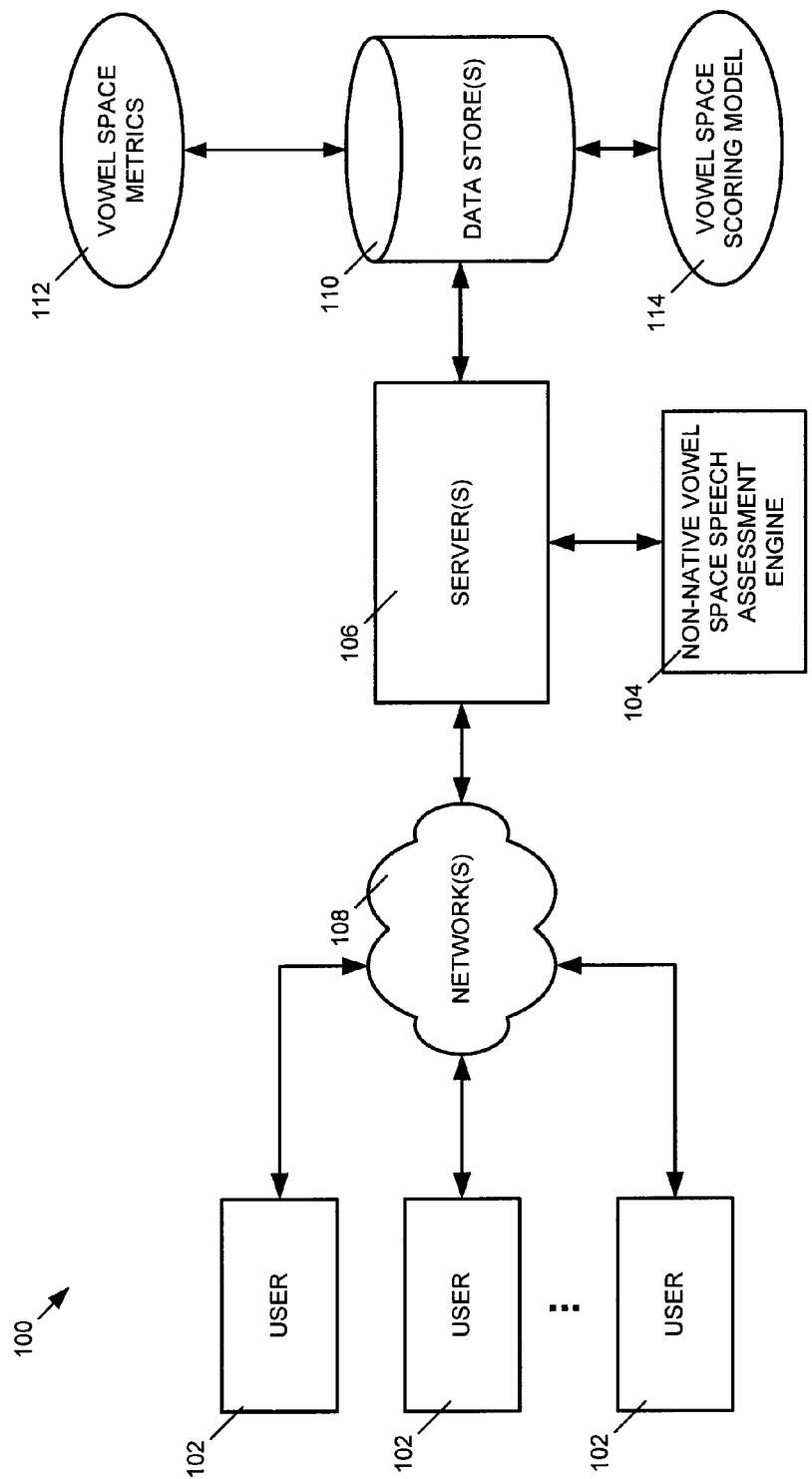
FIG. 1 depicts a computer-implemented environment wherein users can interact with a non-native vowel space speech assessment engine hosted on one or more servers through a network.

FIG. 1 depicts a computer-implemented system 100 wherein users 102 can interact with a non-native vowel space speech assessment engine 104 hosted on one or more servers 106 through a network 108 according to an example. The speech assessment engine 104 can be used for assessing the pronunciation and speaking proficiency of a speaker, such as a speaker speaking a non-native language, by measuring the speaker's ability to produce proper vowel sounds in that non-native language. Measuring speaking proficiency may be useful in a number of contexts, such as a testing context, where an examinee's speaking proficiency must be at a certain level to be considered for a job, admission to a school, citizenship, etc. Measuring speaking proficiency through vowel space assessment may also be useful in a teaching context. While many standard metrics for measuring speech proficiency are not intuitive (e.g., acoustic likelihood scores and phone confidence scores), critiquing of vowel sound pronunciation is intuitive to both student and teacher. Based on an assessment of vowel pronunciation, feedback can be given to a teacher or to a student as to vowel pronunciation errors that are found and suggestions for exercises or activities that may be implemented to improve vowel pronunciation.

The non-native vowel space speech assessment engine 104 may offer a significant degree of efficiency by obviating a need for human scorers to evaluate examinee speech samples. Thus, the non-native vowel space speech assessment engine 104 can be utilized for broader testing over much larger populations of examinees in a cost effective manner, where the engine 104 is provided examinee speech samples, such as via a recording, the engine 104 processes the sample, and the engine 104 provides a proficiency score. The automated non-native vowel space speech assessment engine 104 may also provide improved accuracy and consistency of scoring over human scorers.

With reference to FIG. 1, the engine 104 can be implemented using a processing system (e.g., one or more computer processors) executing software operations or routines for assessing non-native vowel space speech proficiency. User computers 102 can interact with the engine 104 through a number of ways, such as over one or more networks 108. One or more servers 106 accessible through the network(s) 108 can host the non-native vowel space speech assessment engine 104. It should be understood that the non-native vowel space speech assessment engine 104 could also be provided on a stand-alone computer for access by a user. The non-native vowel space speech assessment engine 104 generates an assessment score for non-native speech pronunciation by analyzing acoustic characteristics of vowel pronunciations in a speech sample. The one or more servers 106 are responsive to one or more data stores 110 for providing input data to the non-native vowel space speech assessment engine 104. The one or more data stores 110 may include determined vowel space metrics 112 and vowel space scoring models 114.

Figure 2:
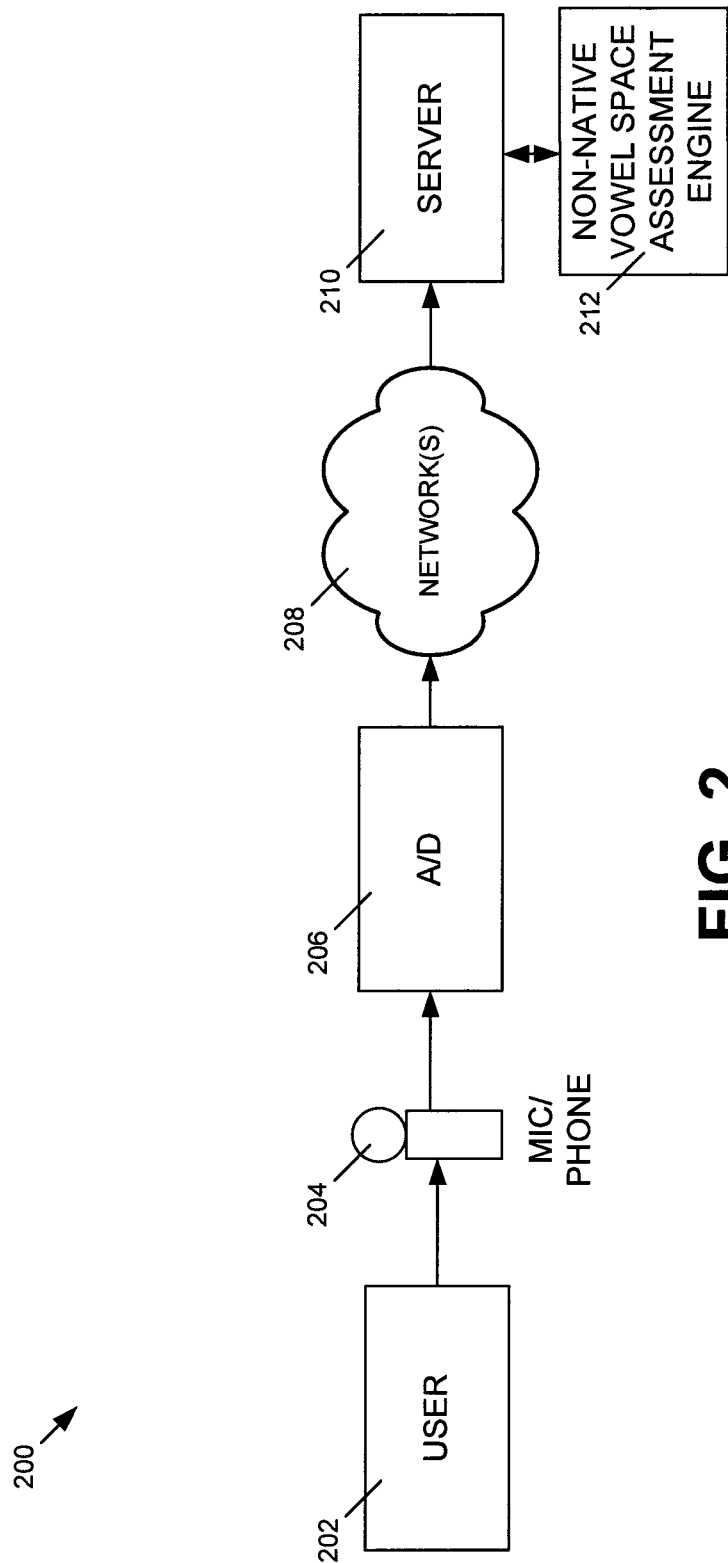
FIG. 2 is a block diagram depicting elements used for capturing speech from a person being evaluated.

FIG. 2 is a block diagram depicting elements used for capturing speech from a person being evaluated according to an example. A user 202 may be prompted to read a selection of text or speak spontaneously into a microphone, telephone, or other sound receiver 204. The signal produced by the user 202 speaking into the microphone 204 is provided to a computer 205 containing an analog to digital (A/D) converter 206 that converts the analog signal received from the microphone 204 into a digital representation of that signal. The digitized signal output from the A/D converter 206 may be stored in computer 205 or transmitted to other computer systems for storage. For example, the digitized signal may be transported via a network 208 for storage on a server 210. The recorded speech can then be analyzed with a non-native vowel space speech assessment engine 212.

Figure 3:
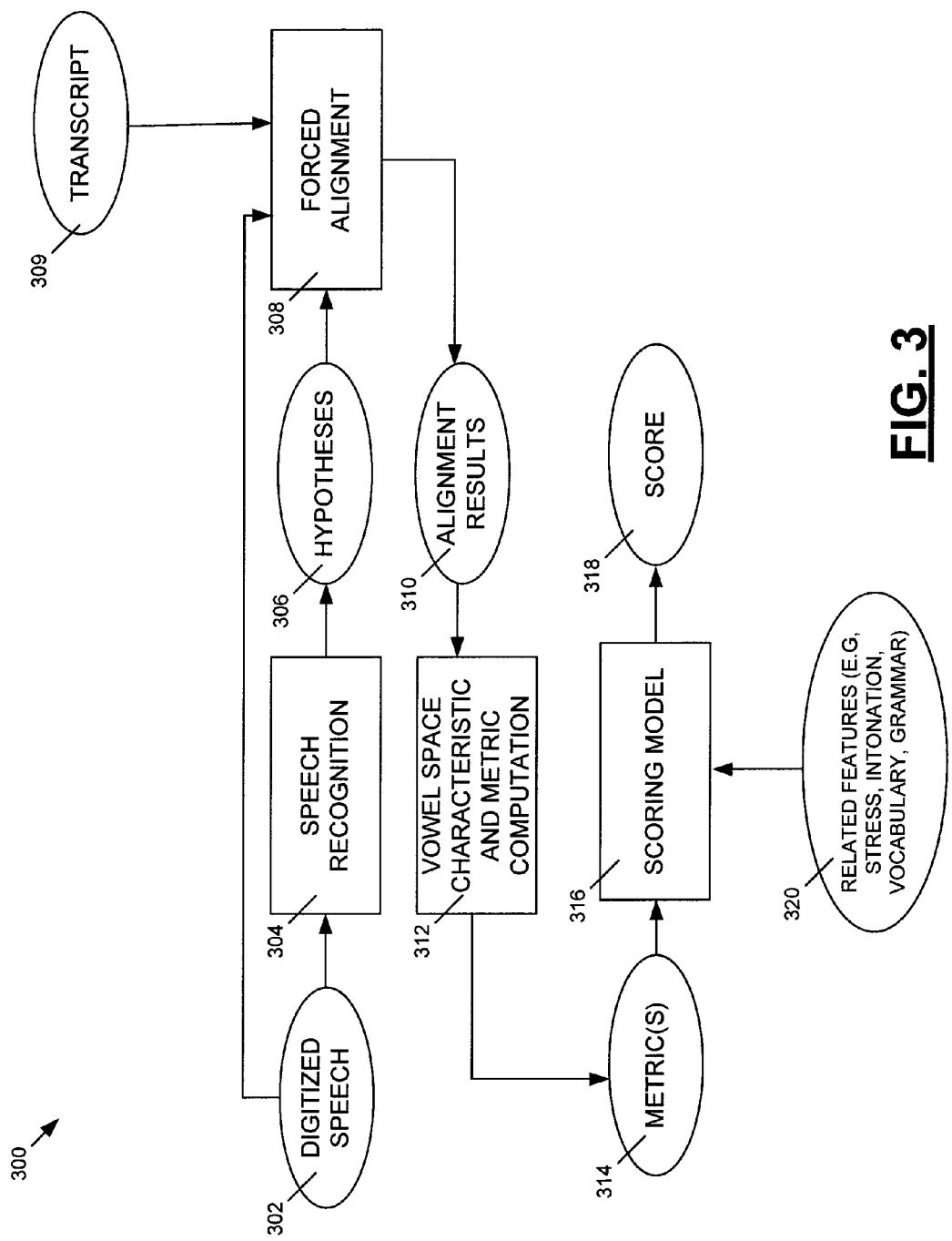
FIG. 3 is a flow diagram depicting a process for assessing spontaneous speech vowel pronunciation of a non-native language speaker.

FIG. 3 is a functional block diagram depicting an exemplary process for assessing spontaneous speech vowel pronunciation of a non-native language speaker. The functions represented can be implemented using any suitable processing system (e.g., one or more computer processors executing software routines written in any suitable programming language such as C, C++, Java, etc.) Digitized speech is received at 302 via an A/D converter. If the speech is spontaneous speech for which a transcript is not known, then the received digitized speech 302 is provided for speech recognition 304. The speech recognition 304 generates word hypotheses 306 of the words in the digitized speech. The word hypotheses are identifications of words that likely correspond to those of the digitized speech.

For spontaneous speech, the hypotheses 306 and the digitized speech 302 are provided for forced alignment 308, sometimes referred to as time alignment. If the speech is scripted speech, such as text read aloud by an examinee into a microphone, then a transcript 309 of the text used by the examinee and the digitized speech 302 are provided for forced alignment 308. If the speech is not scripted, then the speech can be first analyzed using any suitable speech recognition technique such as those conventionally known in the art to generate a script of the speech. The forced alignment 308 creates a time-alignment between the string of words identified in the word hypotheses 306 or transcript 309 and/or the phonemes (e.g., vowel sounds) contained therein with the digitized speech signal 302. This alignment may be performed, for instance, by using any suitable segmentation and alignment techniques such as those conventionally known in the art along with, for example, a Viterbi decoding process to find a most likely match between the transcript phonemes and audio of the digitized speech, such as conventionally known in the art. Such forced alignment may be provided using a number of applications known to those skilled in the art including using a Penn Phonetics Lab Forced Aligner (P2FA), for example. The alignment results 310 may be identified as a list of words or phonemes in the hypotheses 306 or transcript 309 along with their respective start and end times in the digitized speech signal 302.

After aligning words and phonemes with the digitized speech 302, measurements of characteristics of the digitized speech 302 may be extracted. For example, certain vowel pronunciation characteristics may be extracted at 312. Based on the forced alignment procedure 308, the non-native vowel space speech assessment engine can determine the boundaries of the vowel phonemes in the digitized speech by identifying the vowel sounds of interest in the transcript and the associated time periods of the digitized speech sample. Using those boundaries, the assessment engine can access the examinee's pronunciation of those phonemes for characteristic extraction. Raw vowel characteristics may be provided to metric formulas or subjected to other manipulation to identify a plurality of vowel space metrics 314 for the non-native speech sample, such as those described further below.

The vowel space metrics 314 are provided to a scoring model 316, which computes a score 318 for the digitized speech 302. For example, the scoring model 316 may be a regression model that applies a weight to each of the plurality of vowel space metrics to determine the score 318 for the digitized speech sample 302. The scoring model 316 may also consider other metrics 320 in addition to vowel space metrics 314 in determining a score for the digitized speech. For example, the other metrics 320 may include metrics related to speech stress, intonation, vocabulary, or grammar.

FIG. 4 is a table depicting exemplary vowel sounds that may be considered by a non-native vowel space speech assessment engine 104. It has been determined that the ability of a speaker to properly pronounce the listed vowel sounds has a high correlation with overall speech proficiency. This high correlation makes these vowel sounds strong candidates for analysis by a non-native vowel space speech assessment. The use of more peripheral vowels, such as those listed in FIG. 4, is important to good pronunciation, which results in higher intelligibility and a perception of nativeness. A first vowel sound IY is the vowel sound produced when saying words such as each, needs, and week. The AA vowel sound is the vowel sound produced when saying the first syllable of words such as projects, quality, and want. The OW vowel sound is the vowel sound produced when saying the first syllable of located, open, and over. Of course, additional or other vowel sounds may be used.

Figure 5:
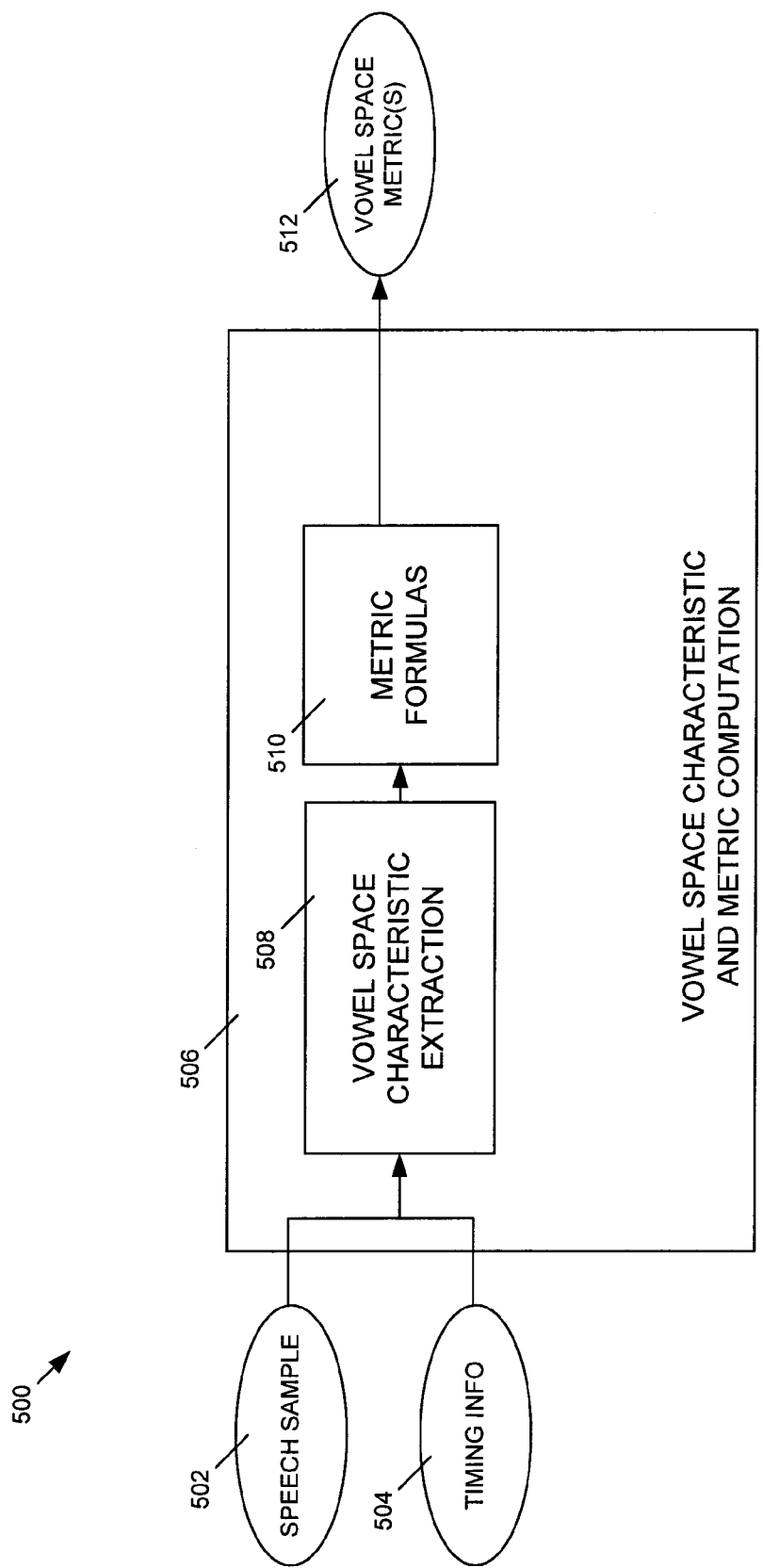
FIG. 5 is a block diagram depicting vowel space characteristic and metric computation.

FIG. 5 is a functional block diagram depicting exemplary vowel space characteristic and metric computation. Alignment results in the form of a speech sample 502 and timing information 504 are received as inputs for vowel space characteristic and metric computation 506. At 508, vowel space characteristic extraction is performed to identify characteristics of vowel pronunciations within the speech sample. For example, the timing information 504 identifies the location and boundaries of vowel pronunciations within the speech sample 502. The portions of the speech sample 502 within those boundaries are accessed and analyzed to extract the vowel space characteristics.

Example vowel space characteristics that may be extracted include vowel formant measurements. A vowel formant measurement is a measurement of an amplitude peak in a vowel spectrum that indicates a resonant frequency of a vowel. Vowel formant measurements are extractable characteristics that may be captured through analysis of the speech sample 502 and the timing information 504.

In one example, F1 and F2 measurements are extracted at a point one-third of the way into the duration of a vowel. In another example, only vowels bearing lexical stress as identified by a dictionary are included in the vowel characteristic extraction. In another example, all vowel tokens preceding the consonant 'R' are excluded from analysis due to a strong centralizing effect that the consonant 'R' has on preceding vowels. In a further example, vowel tokens for each speaker may be normalized to reduce effects of speaker-specific physiological characteristics using z-scores of all formant measurements.

Having extracted vowel characteristics, such as vowel formants F1 and F2, alone or in conjunction with other characteristics, the characteristics are provided to metric formulas 510 or other manipulations to generate vowel space metrics 512 for scoring. A number of different vowel space metrics 512 may be calculated using the metric formulas 510 for consideration by a scoring model.

For example, a vowel space range metric may be considered in scoring a speech sample. The vowel space range represents a method of determining a speaker's coverage of the vowel space. The vowel space range can be calculated by subtracting the overall minimum value from the overall maximum value for both F1 and F2. In the following example, this feature uses the three peripheral vowels IY, AA, and OW discussed with respect to FIG. 4. Example vowel space ranges may be calculated according to:

$$F1 \text{Range} = \text{Max}_{F1}(AA) - \text{Min}_{F1}(IY),$$

where $\text{Max}_{F1}(AA)$ is the maximum value of the first vowel formant measurements for all AA sounds produced by a speaker, and $\text{Min}_{F1}(IY)$ is the minimum value of the first vowel formant measurements for all IY sounds produced by a speaker, and:

$$F2 \text{Range} = \text{Max}_{F2}(IY) - \text{Min}_{F2}(OW),$$

where $\text{Max}_{F2}(IY)$ is the maximum value of the second vowel formant measurements for all IY sounds produced by a speaker, and $\text{Min}_{F2}(OW)$ is the minimum value of the second vowel formant measurements for all OW sounds produced by the speaker. A proficiency score for a speech sample may be calculated based at least in part on one or both of these range metrics.

As another example, a vowel space area metric may be considered in calculating a speech proficiency score. The vowel space area may be used as a measure of the overall coverage of the vowel space as the area of the vowel triangle defined by the mean F1 and F2 characteristic values of the three peripheral vowels. The vowel space area may be calculated according to:

$$\text{area} = \sqrt{s(s - D_{\overline{IY,AA}})(s - D_{\overline{AA,OW}})(s - D_{\overline{OW,IY}})},$$

where $s = 0.5 * (D_{\overline{IY,AA}} + D_{\overline{AA,OW}} + D_{\overline{OW,IY}})$, $\overline{V}$ represents mean F1 and F2 values for vowel V, and $D_{x,y}$ represents a Euclidean distance between two values in an F1-F2 plane:

$$D_{x,y} = \sqrt{(F1_x - F1_y)^2 + (F2_x - F2_y)^2}.$$

Additionally, a vowel space dispersion metric may be defined as an average distance from individual peripheral vowel tokens to the center of the vowel space. The F1 and F2 values of the vowel space center, $\overline{V}$, are the overall mean values of F1 and F2 computed using a speaker's vowel tokens from multiple vowel categories. Thus, the vowel space dispersion may be calculated according to:

$$\text{dispersion} = \frac{\sum D_{IY_i, \overline{V}} + \sum D_{AA_i, \overline{V}} + \sum D_{OW_i, \overline{V}}}{N},$$

where N is a total number of vowel tokens across IY, AA, and OW.

Further metrics may include a within category-vowel dispersion. The within-category vowel dispersion measures how far the tokens for each of the three peripheral vowels (IY, AA, and OW) are from their respective category mean values. Thus, the within-category vowel dispersion metric identifies how spread apart tokens of each of the three vowel classes are. The within-category vowel dispersion can be calculated according to:

$$\text{dispersion} = \frac{1}{3} * \left( \frac{\sum D_{IY_i, \overline{IY}}}{N_{IY}} + \frac{\sum D_{AA_i, \overline{AA}}}{N_{AA}} + \frac{\sum D_{OW_i, \overline{OW}}}{N_{OW}} \right).$$

An additional metric may identify F2-F1 distances based on the extracted vowel characteristics. Among all vowels, the F2-F1 distance is generally largest for IY and smallest for AA. Thus, the F2-F1 distance is positively correlated with intelligibility for IY, because greater distances mean more peripheral tokens of IY, and negatively correlated with intelligibility for AA, because smaller distances mean more peripheral tokens for AA.

Figure 6:
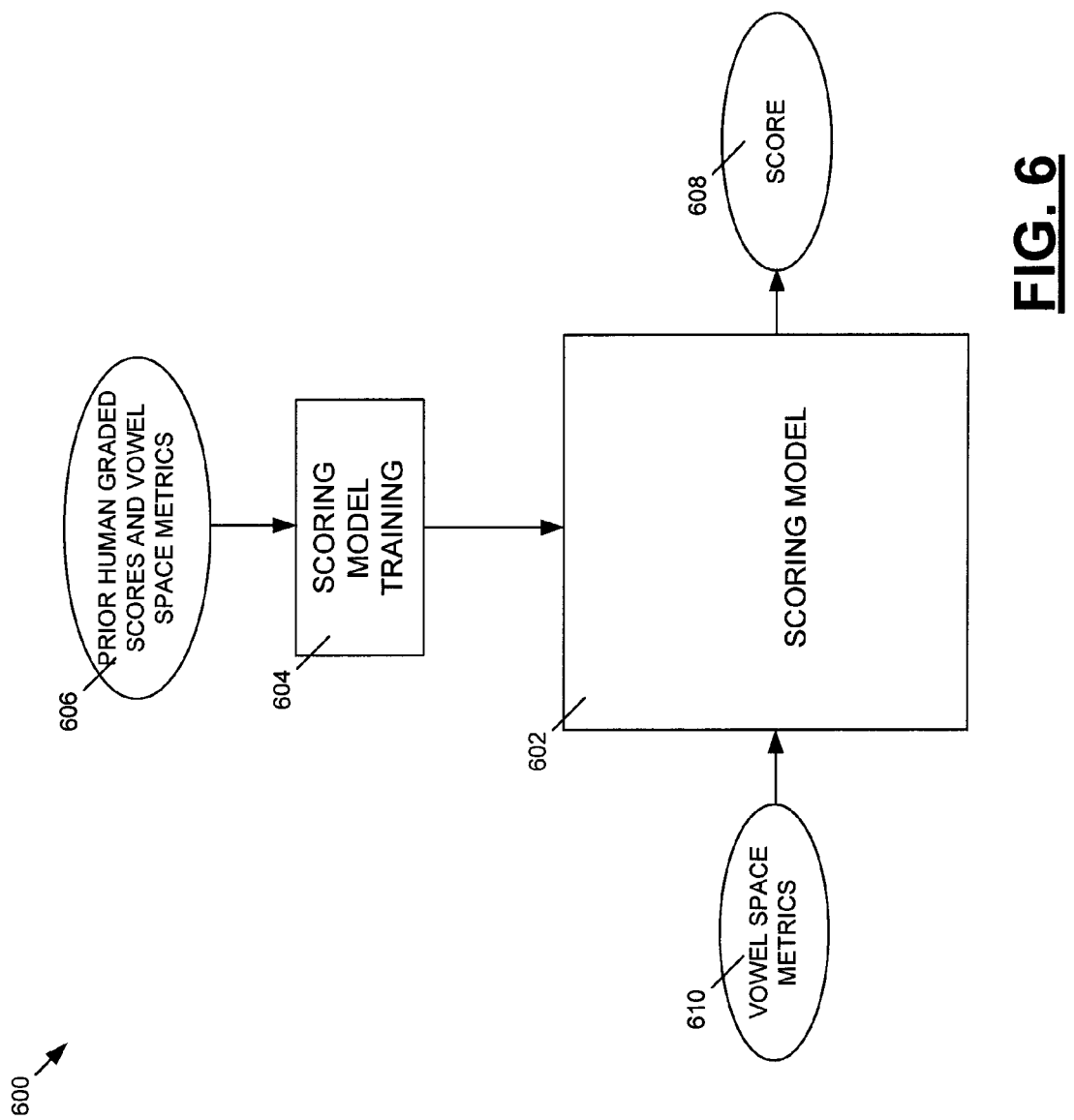
FIG. 6 is a block diagram depicting training of a scoring model and use of the scoring model to score a speech sample.

FIG. 6 is a functional block diagram depicting exemplary training of a scoring model and use of the scoring model to score a speech sample. A scoring model may utilize one or more vowel space metrics to generate a speech proficiency score. For example, a scoring model may use, one, more, or all of the above described vowel space metrics and may further use one or more non-vowel space metrics in generating a score. A scoring model 602 may take a variety of forms, such as a regression model or neural network whose general properties and training are known in the art, but which is now applied to vowel space metrics. At 604, the scoring model is trained. For example, prior human scores of speech proficiency for speech samples may be received along with vowel space metrics 606. The vowel space metrics for a speech sample may be compared to a human given speech proficiency score for that speech sample to identify a correlation between the human score and the vowel space metric. That correlation may be used to set a parameter of the scoring model, such as a vowel space metric weight in a regression scoring model 602.

After the scoring model 602 has been trained, the scoring model 602 is ready to provide scores 608 for a speech sample. As discussed above, vowel space metrics 610 are identified based on vowel characteristics extracted from a speech sample. The vowel space metrics 610 are provided to the scoring model 602 and used to determine a speech proficiency score for a speech sample.

Figure 7:
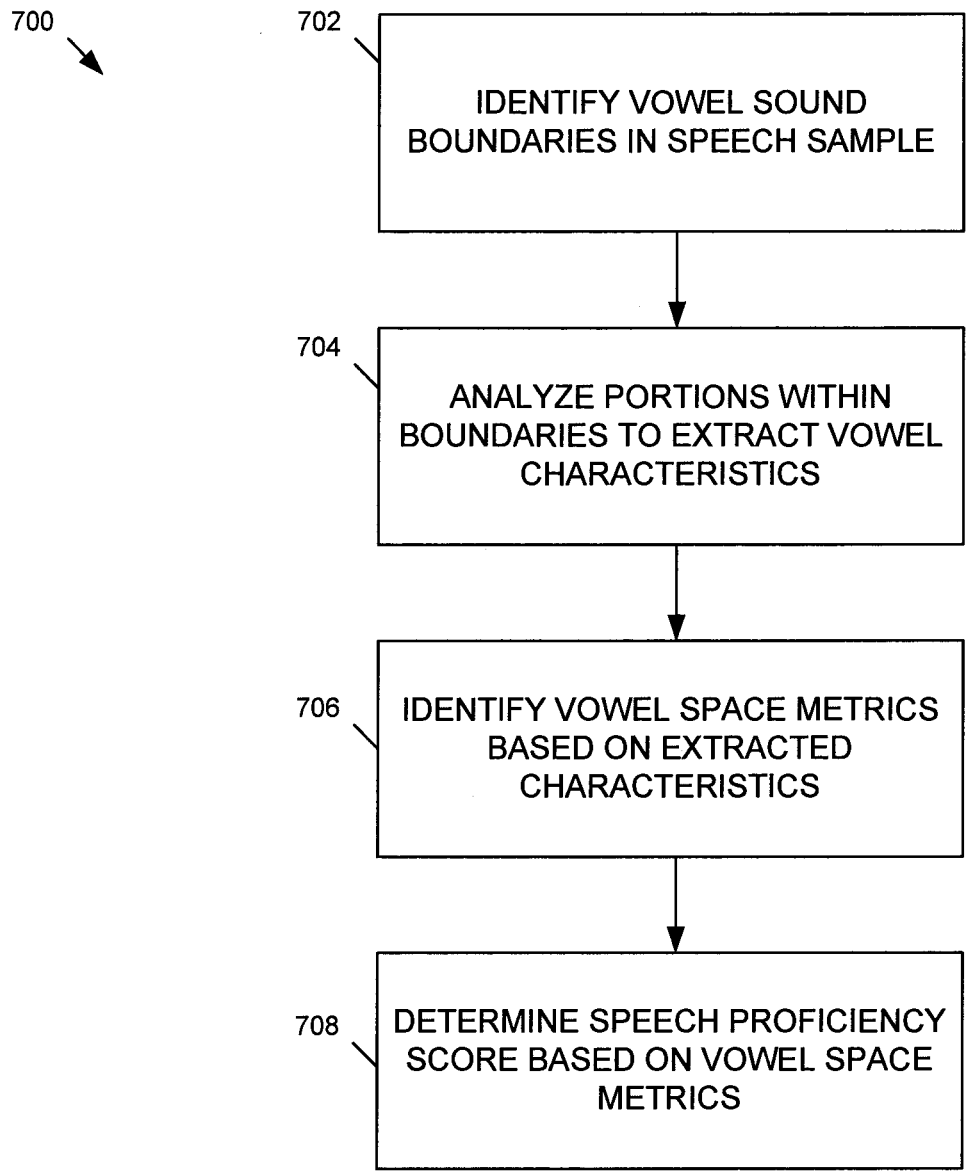
FIG. 7 is a flow diagram depicting a computer-implemented method of assessing non-native speech proficiency.

FIG. 7 is a flow diagram depicting an exemplary computer-implemented method of assessing non-native speech proficiency. At 702, a non-native speech sample is processed by a processing system to identify a plurality of vowel sound boundaries in the non-native speech sample. The portions of the non-native speech sample within the vowel sound boundaries are analyzed at 704 by the processing system to extract vowel characteristics. At 706, the vowel characteristics are used to identify a plurality of vowel space metrics for the non-native speech sample, and at 708, the vowel space metrics are used to determine a non-native speech proficiency score for the non-native speech sample. Steps 704-708 can be carried out automatically by the processing system without any further user intervention once the speech sample has been obtained by the processing system. The scores can be reported to the non-native speaker (e.g., a student) or to an instructor. For example, the non-native speech sample could be obtained from a non-native speaker as part of a test in which the non-native speaker is required to read a block of text in a computer-based testing scenario using networked or stand-alone computer(s). Alternatively, the speech sample could be obtained in an instructional setting (e.g., in a self-study or classroom study) using a networked and/or stand alone computer(s).

Experimental Results

Two experimental studies were conducted. For the first study, a single Read Aloud item was selected for analysis from among several responses provided by speakers in an English proficiency assessment. This item consisted of a paragraph containing 96 words which the speakers were instructed to read out loud in a natural manner. The entire response was then scored by experienced human raters using a three-point scale for overall pronunciation assessment. The non-native speech scored as the score 1 (low-level) is not generally intelligible; the non-native speech scored as the scale 2 (medium-level) is generally intelligible with some lapses; the non-native speech scored as the score 3 (high-level) is highly intelligible.

For each of the three score levels, 5 female and 5 male speakers were selected who all shared the same L1 for analysis. In addition, the same paragraph was read by two female and two male native speakers of American English. As a result, this study contains speech data corresponding to four score levels from a total of 34 speakers: low-level (NNS1), medium-level (NNS2), and high-level (NNS3) for Non-Native Speakers, as well as Native Speakers (NS).

All stressed tokens of the peripheral vowels IY, AA, and OW were used to compute the vowel space features, subject to the exclusions described above using vowel formants. The relevant words contained in the Read Aloud item from this assessment are listed in Table 1.

TABLE 1

Words Used in First Study

| Vowel | Word Tokens |
| --- | --- |
| IY | each, needs, week |
| AA | projects, quality, want |
| OW | located, open, over |

To assess the ability of a feature to discriminate among the different pronunciation proficiency levels, we calculated the Spearman rank order correlation coefficient, ρ, between the pronunciation scores and each of the vowel space features. These results are summarized in Table 2.

TABLE 2

First Study Results

| Feature | Spearman correlation |
| --- | --- |
| F1 Range | −0.08 |
| F2 Range | 0.11 |
| Area | 0.01 |
| Dispersion | 0.31 |

TABLE 2-continued

First Study Results

| Feature | Spearman correlation |
| --- | --- |
| Within-category dispersion | −0.15 |
| F2-F1 for IY | 0.38 |
| F2-F1 for AA | −0.47 |

As Table 2 shows, two of the vowel space features had significant correlations with pronunciation scores for the Read Aloud items from these 34 speakers: the F2-F1 distance for IY and AA. The correlations were in the directions expected by the hypothesis that more peripheral vowels lead to more intelligible pronunciation. Such promising findings show that some measurements of vowel spaces that were previously used on assessing speech intelligibility are potentially helpful for assessing pronunciations.

A second study was also conducted with a larger amount of data. In the second study, 325 non-native speakers who shared the same L1 responded to four Read Aloud items each in an English proficiency assessment. Due to the design of the assessment, there were three distinct sets of four Read Aloud items, meaning that the speakers did not all produce the same lexical items, as they did in the first study. However, the number of tokens produced in each vowel category by each speaker was much higher, thus facilitating the comparison among speakers who read different items. As in the first study, the responses were scored by human raters on a three-point scale for pronunciation proficiency. In this second study, the responses were subsequently transcribed (to eliminate the effect of reading errors on the forced alignment procedure) and processed using the P2FA forced alignment system. Vowel formant measurements were again extracted according to the methodology described above using vowel formants.

The total number of tokens produced by each speaker that were used to calculate the vowel features varied, due to the different sets of Read Aloud items, and the fact that speakers did not always produce the text accurately. The mean number of tokens (and standard deviation) for each vowel produced by the 325 speakers in this experiment are as follows: 16.2 (5.0) for IY, 10.7 (3.8) for AA, and 9.0 (2.6) for OW.

Since no native speaker responses exist for the items used in this experiment, a source of native speaker vowel measurements from another domain was substituted. We used the Atlas of North American English corpus, which includes data from 437 speakers throughout North America. Several speakers from every dialect region were included in the sample. Each speaker participated in an interview consisting of spontaneous speech and targeted elicitation of specific lexical items. Approximately 300 vowel formant measurements were extracted for each speaker and were manually verified. This corpus thus provides the most detailed sample of vowel formant variation among native speakers of English in North America. The mean number of vowel formant measurements (and standard deviation) for the three peripheral vowels from the speakers in this corpus are as follows: 12.5 (5.9) for IY, 27.6 (8.6) for AA, and 18.1 (7.7) for OW.

As in the first study, the usefulness of each feature at discriminating among the levels of pronunciation proficiency is determined by calculating the Spearman rank-order coefficients between the feature values and the pronunciation proficiency scores. Since each non-native speaker responded to four Read Aloud items in the large-scale experiment, it is possible to compute both item-level and speaker-level correlations between the proficiency scores and the vowel space features (this was not possible for the first study, since only a single Read Aloud item was used). For the speaker-level results, all of the vowel tokens from a single speaker were pooled together to compute the speaker-level vowel space features, and the four pronunciation scores for the different items were added together. These results are summarized in Table 3.

TABLE 3

Large-Scale Study Results

| Feature | Spearman correlation | |
|---|---|---|
| | Item-level | Speaker-level |
| F1 Range | 0.55 | 0.32 |
| F2 Range | 0.55 | 0.25 |
| Area | 0.43 | 0.58 |
| Dispersion | 0.23 | 0.34 |
| Within-category dispersion | -0.17 | -0.71 |
| F2-F1 for IY | 0.63 | 0.78 |
| F2-F1 for AA | -0.42 | -0.58 |

Table 3 shows that the correlations between all vowel space features and pronunciation proficiency scores were significant and moderately strong. In addition, the use of speaker-level scores generally improved the correlation values—the only two exceptions were the features involving ranges. The best-performing feature was the F2-F1 distance for the vowel IY, with a correlation of $\rho=078$.

Furthermore, the correlations for each feature had the polarity expected given the hypothesis that an expanded vowel space leads to higher pronunciation proficiency scores. As in the first study, the F2-F1 distance for IY was positively correlated with pronunciation scores, and the F2-F1 distance for AA had a negative correlation. The two range features, the area feature, and the overall dispersion feature all have positive correlations with pronunciation scores, indicating that an expanded vowel space leads to a rater's perception that the speaker is more native-like.

Figure 8:
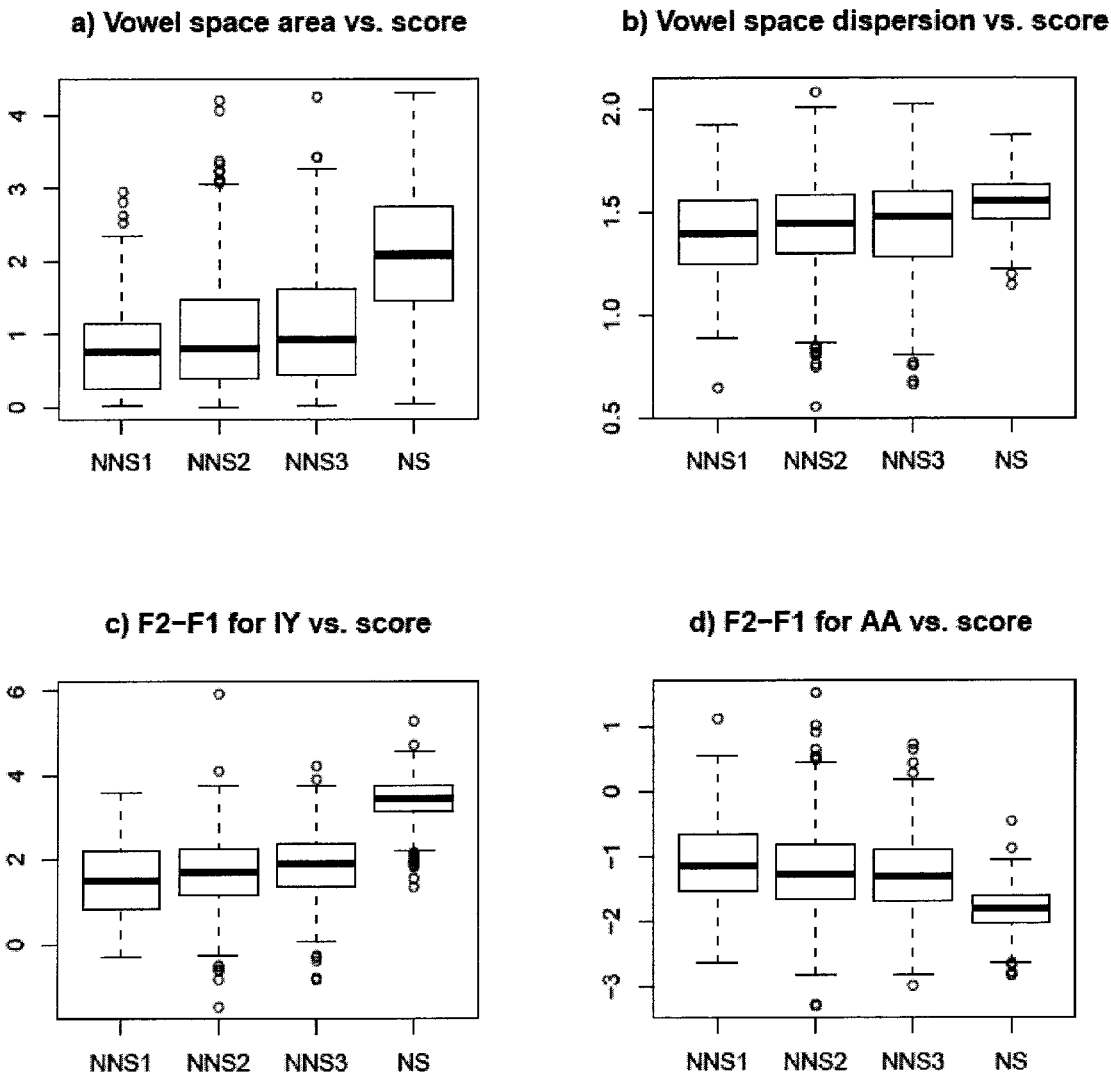
FIG. 8 presents boxplots of the distributions for four of the features in the item-level analysis

FIG. 8 presents boxplots of the distributions for four of the features in the item-level analysis (the plots for the other three features also show similar patterns). In each case, the plots display a monotonic trend for the mean value of the feature from the lowest non-native proficiency level to the native speakers. While there is substantial overlap between the three non-native categories, the difference between the native speaker distribution and the three non-native speaker distributions for each vowel space feature is quite pronounced.

Table 4 presents a correlation matrix showing how the vowel space features pattern with respect to each other for the item-level analysis in this experiment. All of the pairs except one show significant correlations, but none of the correlations has a magnitude greater than 0.70.

TABLE 4

Correlation Matrix for Six Vowel Space Features Using the Item-Level Features

| | F2 Range | Area | Dispersion | w.c. Dispersion | F2-F1 for IY | F2-F1 for AA |
|---|---|---|---|---|---|---|
| F1 Range | 0.44 | 0.54 | 0.42 | 0.07 | 0.53 | -0.56 |
| F2 Range | — | 0.58 | 0.47 | 0.10 | 0.70 | -0.37 |
| Area | — | — | 0.58 | -0.29 | 0.68 | -0.53 |
| Dispersion | — | — | — | n.s. | 0.44 | -0.54 |
| w.c. dispersion | — | — | — | — | -0.29 | 0.24 |
| F2-F1 for IY | — | — | — | — | — | -0.49 |

Figure 9A:
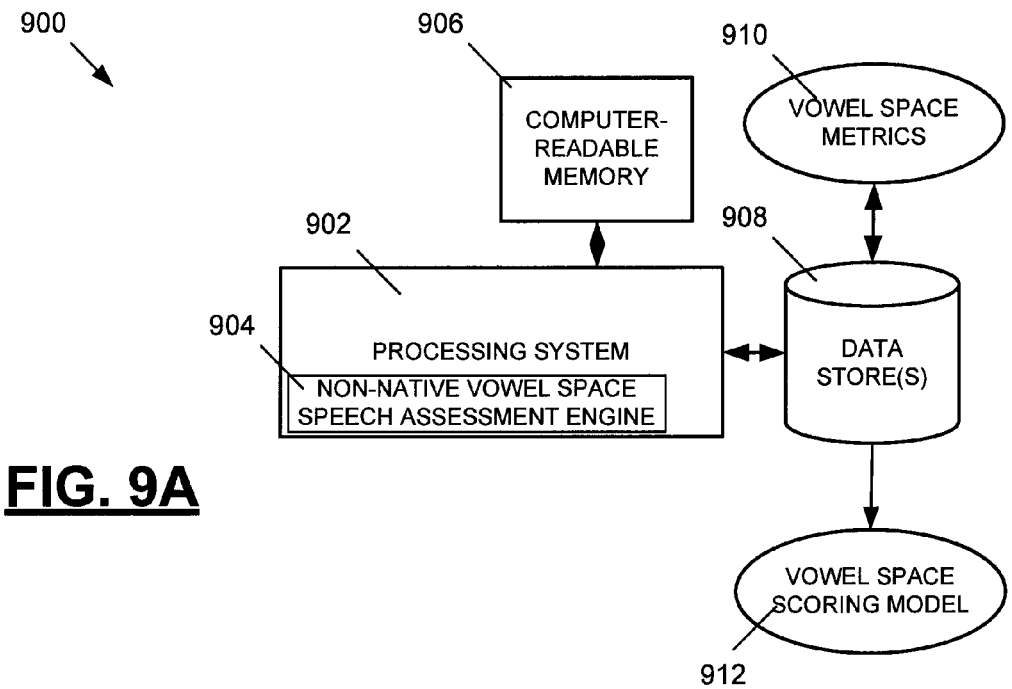
FIGS. 9A, 9B, and 9C depict example systems for use in implementing a non-native vowel space speech assessment engine.
Figure 9B:
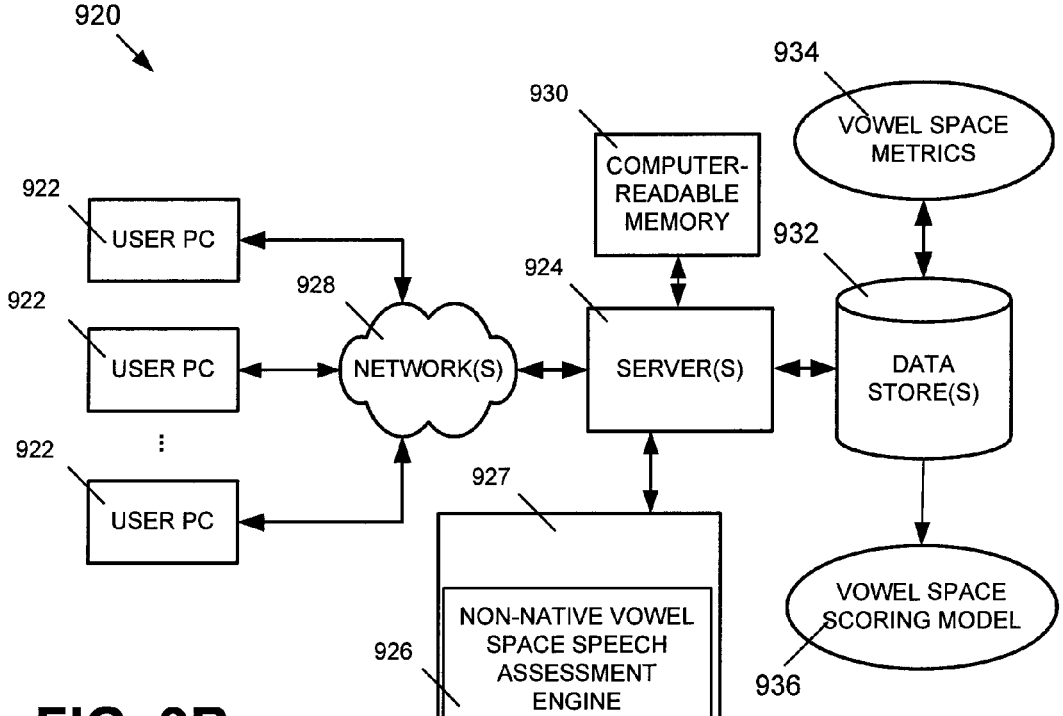
Figure 9C:
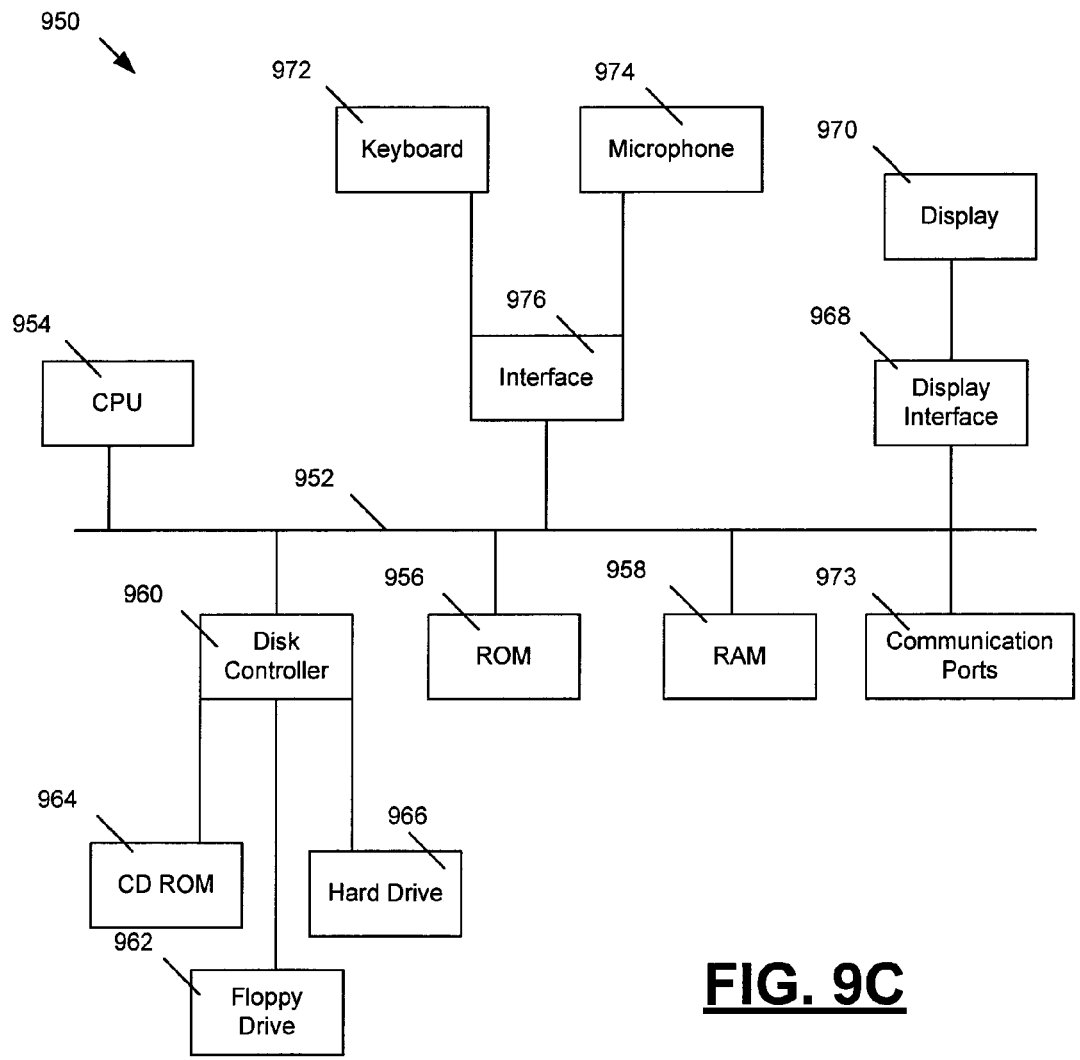

FIGS. 9A, 9B, and 9C depict example systems for use in implementing a non-native vowel space speech assessment engine. For example, FIG. 9A depicts an exemplary system 900 that includes a stand alone computer architecture where a processing system 902 (e.g., one or more computer processors) includes a non-native vowel space speech assessment engine 904 being executed on it. The processing system 902 has access to a computer-readable memory 906 in addition to one or more data stores 908. The one or more data stores 908 may contain vowel space metrics 910 as well as a vowel space scoring model 912.

FIG. 9B depicts a system 920 that includes a client server architecture. One or more user PCs 922 accesses one or more servers 924 running a non-native vowel space speech assessment engine 926 on a processing system 927 via one or more networks 928. The one or more servers 924 may access a computer readable memory 930 as well as one or more data stores 932. The one or more data stores 932 may contain vowel space metrics 934 as well as a vowel space scoring model 936.

FIG. 9C shows a block diagram of exemplary hardware for a standalone computer architecture 950, such as the architecture depicted in FIG. 9A, that may be used to contain and/or implement the program instructions of exemplary embodiments. A bus 952 may serve as the information highway interconnecting the other illustrated components of the hardware. A processing system 954 labeled CPU (central processing unit) (e.g., one or more computer processors), may perform calculations and logic operations required to execute a program. A computer-readable storage medium, such as read only memory (ROM) 956 and random access memory (RAM) 958, may be in communication with the processing unit 954 and may contain one or more programming instructions for performing the method of implementing a non-native vowel space speech assessment engine. Optionally, program instructions may be stored on a non-transitory computer readable storage medium such as a magnetic disk, optical disk, recordable memory device, flash memory, RAM, ROM, or other physical storage medium. Computer instructions may also be communicated via a communications signal, or a modulated carrier wave and then stored on a non-transitory computer-readable storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. For example, a non-native vowel space speech assessment engine may be configured for use in scoring an examinee's ability to speak a native language in addition to non-native proficiency testing. The embodiments are merely illustrative and should not be considered restrictive. The scope of the invention is reflected in the claims, rather than the preceding description, and all variations and equivalents which fall within the range of the claims are intended to be embraced therein.

For example, the systems and methods may utilize data signals conveyed via networks (e.g., local area network, wide area network, internet, combinations thereof, etc.), fiber optic medium, modulated carrier waves, wireless networks, etc. for communication with one or more data processing devices. The data signals can carry any or all of the data disclosed herein that is provided to or from a device. Additionally, the methods and systems described herein may be implemented on many different types of processing devices by computer program code comprising program instructions that are executable by a processing system. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. Instructions may be written in any suitable computer programming language such as C, C++, Java, etc.

The data (e.g., associations, mappings, data input, data output, intermediate data results, final data results, etc.) received and processed may be stored and implemented in one or more different types of computer-implemented data stores, such as different types of computer-readable storage devices (e.g., RAM, ROM, Flash memory, magnetic disks, optical disks, etc.) and programming constructs (e.g., flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. Software operation can be implemented, for example, as a subroutine unit of code, a software function unit of code, an object (as in an object-oriented paradigm), an applet, or in a computer script language, or as another type of computer code. The software components and/or functionality may be located on a single computer or distributed across multiple computers in communication with one another depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Additionally, use of the term "each" does not necessarily mean "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of assessing non-native speech proficiency, comprising:
    processing, using a processing system, a non-native speech sample to identify vowel sounds in the non-native speech sample and vowel sound boundaries corresponding to the vowel sounds in the non-native speech sample;
    analyzing, using the processing system, the vowel sounds within the vowel sound boundaries to extract vowel characteristics;
    processing, using the processing system, the vowel sounds and the vowel characteristics to identify a plurality of vowel space metrics for the non-native speech sample, wherein the vowel space metrics indicate an extent of proficient utilization of AA, IY, and OW vowel sounds in the non-native speech sample; and
    generating using the processing system, a non-native speech proficiency score based upon the plurality of vowel space metrics for the non-native speech sample, wherein the non-native speech proficiency score provides a measure of a pronunciation proficiency of the non-native speech sample based upon the plurality of vowel space metrics, wherein the non-native speech proficiency score is generated by processing the plurality of vowel space metrics with a statistical computer model, the statistical computer model comprising multiple weighted features determined by training the statistical computer model relative to a plurality of training items, the training utilizing calculated vowel space metrics of the training items and human-scored non-native speech proficiency scores of the training items to determine values for the weighted features.

2. The method of claim 1, wherein the vowel characteristics comprise vowel formant measurements.

3. The method of claim 2, wherein a vowel formant measurement comprises a measurement of an amplitude peak in a vowel spectrum that indicates a resonant frequency of a vowel.

4. The method of claim 1, wherein the vowel space metrics comprise a vowel space range, a vowel space area, a vowel space dispersion, a within category vowel dispersion, or a F2-F1 distance.

5. The method of claim 4, wherein the vowel space metrics comprise a vowel space range, wherein the vowel space range, F1 Range, is calculated according to $$F1\text{Range} = \text{Max}_{F1}(AA) - \text{Min}_{F1}(IY),$$

where $\text{Max}_{F1}(AA)$ is the maximum value of the first vowel formant measurements for all AA vowel sounds produced by a speaker, and $\text{Min}_{F1}(IY)$ is the minimum value of the first vowel formant measurements for all IY vowel sounds produced by a speaker.

6. The method of claim 5, wherein the vowel space metrics comprise a second vowel space range, wherein the second vowel space range, F2Range, is calculated according to $$F2\text{Range} = \text{Max}_{F2}(IY) - \text{Min}_{F2}(OW),$$

where $\text{Max}_{F2}(IY)$ is the maximum value of the second vowel formant measurements for all IY vowel sounds produced by a speaker, and $\text{Min}_{F2}(OW)$ is the minimum value of the second vowel formant measurements for all OW vowel sounds produced by the speaker, wherein the non-native speech proficiency score is determined based on the F1Range and F2Range vowel space metrics.

7. The method of claim 1, wherein one or more of the vowel space metrics are calculated based on a first vowel characteristic, formant F1, and a second vowel characteristic, formant F2;
   wherein the vowel space metrics comprise an area of a vowel triangle defined by a mean F1 and F2 values of the AA, IY, and OW vowel sounds.

8. The method of claim 7, wherein the area is calculated according to:

$$area = \sqrt{s(s-D_{\overline{IY},\overline{AA}})(s-D_{\overline{AA},\overline{OW}})(s-D_{\overline{OW},\overline{IY}})},$$

where $s=0.5*(D_{\overline{IY},\overline{AA}}+D_{\overline{AA},\overline{OW}}+D_{\overline{OW},\overline{IY}})$, $\overline{V}$ represents mean F1 and F2 values for vowel V, and $D_{x,y}$ represents a Euclidean distance between two values in an F1-F2 plane:

$$D_{x,y} = \sqrt{(F1_x - F1_y)^2 + (F2_x - F2_y)^2}.$$

9. The method of claim 1, wherein one or more of the vowel space metrics are calculated based on a first vowel space characteristic, formant F1, and a second vowel space characteristic, formant F2;
   wherein the vowel space metrics comprise a vowel space dispersion based on an average distance from individual AA, IY, and OW vowel tokens to a center of a vowel space.

10. The method of claim 9, wherein the vowel space center, $\overline{V}$, is a mean of the F1 and F2 vowel space characteristics, wherein the vowel space dispersion is calculated according to:

$$dispersion = \frac{\sum D_{IY_i,\overline{V}} + \sum D_{AA_i,\overline{V}} + \sum D_{OW_i,\overline{V}}}{N},$$

where N is a total number of vowel tokens across IY, AA, and OW.

11. The method of claim 1, wherein one or more of the vowel space metrics are calculated based on a first vowel space characteristic, formant F1, and a second vowel space characteristic, formant F2;
   wherein the vowel space metrics comprise a within category vowel space dispersion.

12. The method of claim 11, wherein the within category vowel space dispersion is calculated according to:

$$dispersion = \frac{1}{3} * \left( \frac{\sum D_{IY_i,\overline{IY}}}{N_{IY}} + \frac{\sum D_{AA_i,\overline{AA}}}{N_{AA}} + \frac{\sum D_{OW_i,\overline{OW}}}{N_{OW}} \right),$$

where $N_{IY}$ is a number of IY vowel tokens, $N_{AA}$ is a number of AA vowel tokens, $N_{OW}$ is a number of OW vowel tokens, $D_{IY_i,\overline{IY}}$ is a distance from an IY vowel token i to mean F1 and F2 values for vowel IY, $D_{AA_i,\overline{AA}}$ is a distance from an AA vowel token i to mean F1 and F2 values for vowel AA, and $D_{OW_i,\overline{OW}}$ is a distance from an OW vowel token i to mean F1 and F2 values for vowel OW.

13. The method of claim 1, wherein one or more of the vowel space metrics are calculated based on a first vowel space characteristic, F1, and a second vowel space characteristic, F2;
   wherein the vowel space metrics comprise an F2-F1 distance.

14. The method of claim 1, wherein the non-native speech proficiency score is automatically provided via a graphical user interface to provide feedback on non-native speech proficiency.

15. The method of claim 14, wherein the feedback offers vowel pronunciation suggestions for improving communicative competence through better vowel pronunciation.

16. The method of claim 1, further comprising performing automatic speech recognition on the non-native speech sample to generate a transcript, wherein the transcript is used to identify the vowel sound boundaries.

17. The method of claim 1, wherein a forced alignment procedure is used to identify the plurality of vowel sound boundaries.

18. The method of claim 1, wherein the non-native speech proficiency score is determined based on one or more non-vowel-space-based metrics.

19. The method of claim 18, wherein the non-native speech proficiency score is further based on a stress metric, an intonation metric, a vocabulary metric, or a grammar metric.

20. A computer-implemented system for assessing non-native speech proficiency, comprising:
   one or more data processors; and
   one or more memories, wherein the one or more data processors are configured to execute steps comprising:
      processing a non-native speech sample to identify vowel sounds in the non-native speech sample and vowel sound boundaries corresponding to the vowel sounds in the non-native speech sample;
      analyzing the vowel sounds within the vowel sound boundaries to extract vowel characteristics;
      processing the vowel sounds and the vowel characteristics to identify a plurality of vowel space metrics for the non-native speech sample, wherein the vowel space metrics indicate an extent of proficient utilization of AA, IY, and OW vowel sounds in the non-native speech sample; and
      generating a non-native speech proficiency score based upon the plurality of vowel space metrics for the non-native speech sample, wherein the non-native speech proficiency score provides a measure of a pronunciation proficiency of the non-native speech sample based upon the plurality of vowel space metrics, wherein the non-native speech proficiency score is generated by processing the plurality of vowel space metrics with a statistical computer model, the statistical computer model comprising multiple weighted features determined by training the statistical computer model relative to a plurality of training items, the training utilizing calculated vowel space metrics of the training items and human-scored non-native speech proficiency scores of the training items to determine values for the weighted features.

21. A non-transitory computer-readable storage medium comprising instructions for which when executed cause a processing system to execute steps comprising:
   processing a non-native speech sample to identify vowel sounds in the non-native speech sample and vowel sound boundaries corresponding to the vowel sounds in the non-native speech sample;
   analyzing the vowel sounds within the vowel sound boundaries to extract vowel characteristics;
   processing the vowel sounds and the vowel characteristics to identify a plurality of vowel space metrics for the non-native speech sample, wherein the vowel space metrics indicate an extent of proficient utilization of AA, IY, and OW vowel sounds in the non-native speech sample; and generating a non-native speech proficiency score based upon the plurality of vowel space metrics for the non-native speech sample, wherein the non-native speech proficiency score provides a measure of a pronunciation proficiency of the non-native speech sample based upon the plurality of vowel space metrics, wherein the non-native speech proficiency score is generated by processing the plurality of vowel space metrics with a statistical computer model, the statistical computer model comprising multiple weighted features determined by training the statistical computer model relative to a plurality of training items, the training utilizing calculated vowel space metrics of the training items and human-scored non-native speech proficiency scores of the training items to determine values for the weighted features.

22. The computer-implemented system of claim 20, wherein the vowel space metrics comprise a vowel space range, a vowel space area, a vowel space dispersion, a within category vowel dispersion, or a F2-F1 distance.

23. The computer-implemented system of claim 22, wherein the vowel space metrics comprise a vowel space range, wherein the vowel space range, F1 Range, is calculated according to $$F1\text{Range} = \text{Max}_{F1}(AA) - \text{Min}_{F1}(IY),$$

where $\text{Max}_{F1}(AA)$ is the maximum value of the first vowel formant measurements for all AA vowel sounds produced by a speaker, and $\text{Min}_{F1}(IY)$ is the minimum value of the first vowel formant measurements for all IY vowel sounds produced by a speaker.

24. The computer-implemented system of claim 23, wherein the vowel space metrics comprise a second vowel space range, wherein the second vowel space range, F2Range, is calculated according to $$F2\text{Range} = \text{Max}_{F2}(IY) - \text{Min}_{F2}(OW),$$

where $\text{Max}_{F2}(IY)$ is the maximum value of the second vowel formant measurements for all IY vowel sounds produced by a speaker, and $\text{Min}_{F2}(OW)$ is the minimum value of the second vowel formant measurements for all OW vowel sounds produced by the speaker, wherein the non-native speech proficiency score is determined based on the F1Range and F2Range vowel space metrics.

25. The computer-implemented system of claim 20, wherein the steps include performing automatic speech recognition on the non-native speech sample to generate a transcript, and wherein the transcript is used to identify the vowel sound boundaries.

26. The computer-implemented system of claim 20, wherein a forced alignment procedure is used to identify the plurality of vowel sound boundaries.

27. The non-transitory computer-readable storage medium of claim 21, wherein the vowel space metrics comprise a vowel space range, a vowel space area, a vowel space dispersion, a within category vowel dispersion, or a F2-F1 distance.

28. The non-transitory computer-readable storage medium of claim 27, wherein the vowel space metrics comprise a vowel space range, wherein the vowel space range, F1 Range, is calculated according to $$F1\text{Range} = \text{Max}_{F1}(AA) - \text{Min}_{F1}(IY),$$

where $\text{Max}_{F1}(AA)$ is the maximum value of the first vowel formant measurements for all AA vowel sounds produced by a speaker, and $\text{Min}_{F1}(IY)$ is the minimum value of the first vowel formant measurements for all IY vowel sounds produced by a speaker.

29. The non-transitory computer-readable storage medium of claim 28, wherein the vowel space metrics comprise a second vowel space range, wherein the second vowel space range, F2Range, is calculated according to $$F2\text{Range} = \text{Max}_{F2}(IY) - \text{Min}_{F2}(OW),$$

where $\text{Max}_{F2}(IY)$ is the maximum value of the second vowel formant measurements for all IY vowel sounds produced by a speaker, and $\text{Min}_{F2}(OW)$ is the minimum value of the second vowel formant measurements for all OW vowel sounds produced by the speaker, wherein the non-native speech proficiency score is determined based on the F1Range and F2Range vowel space metrics.

30. The non-transitory computer-readable storage medium of claim 21, wherein the instructions cause the processing system to perform automatic speech recognition on the non-native speech sample to generate a transcript, and wherein the transcript is used to identify the vowel sound boundaries.

31. The non-transitory computer-readable storage medium of claim 21, wherein a forced alignment procedure is used to identify the plurality of vowel sound boundaries.

32. The computer-implemented method of claim 1 comprising:

normalizing one or more vowel tokens included in the non-native speech sample to reduce effects of speaker-specific physiological characteristics.

33. The computer-implemented system of claim 20, wherein the non-native speech proficiency score is determined based on one or more non-vowel-space-based metrics.

34. The computer-implemented system of claim 20, wherein the non-native speech proficiency score is further based on a stress metric, an intonation metric, a vocabulary metric, or a grammar metric.

35. The non-transitory computer-readable storage medium of claim 21, wherein the non-native speech proficiency score is determined based on one or more non-vowel-space-based metrics.

36. The non-transitory computer-readable storage medium of claim 21, wherein the non-native speech proficiency score is further based on a stress metric, an intonation metric, a vocabulary metric, or a grammar metric.

37. The computer-implemented system of claim 20, wherein one or more of the vowel space metrics are calculated based on a first vowel characteristic, formant F1, and a second vowel characteristic, formant F2;

wherein the vowel space metrics comprise an area of a vowel triangle defined by a mean F1 and F2 values of the AA, IY, and OW vowel sounds.

38. The computer-implemented system of claim 37, wherein the area is calculated according to:

$$\text{area} = \sqrt{s(s - D_{\overline{IY,AA}})(s - D_{\overline{AA,OW}})(s - D_{\overline{OW,IY}})},$$

where $s = 0.5 * (D_{\overline{IY,AA}} + D_{\overline{AA,OW}} + D_{\overline{OW,IY}})$, $\overline{V}$ represents mean F1 and F2 values for vowel V, and $D_{x,y}$ represents a Euclidean distance between two values in an F1-F2 plane:

$$D_{x,y} = \sqrt{(F1_x - F1_y)^2 + (F2_x - F2_y)^2}.$$

39. The computer-implemented system of claim 20, wherein one or more of the vowel space metrics are calculated based on a first vowel space characteristic, formant F1, and a second vowel space characteristic, formant F2;

wherein the vowel space metrics comprise a within category vowel space dispersion.

40. The computer-implemented system of claim 39, wherein the within category vowel space dispersion is calculated according to:

$$\text{dispersion} = \frac{1}{3} * \left( \frac{\sum D_{IY_i,\overline{IY}}}{N_{IY}} + \frac{\sum D_{AA_i,\overline{AA}}}{N_{AA}} + \frac{\sum D_{OW_i,\overline{OW}}}{N_{OW}} \right),$$

where $N_{IY}$ is a number of IY vowel tokens, $N_{AA}$ is a number of AA vowel tokens, $N_{OW}$ is a number of OW vowel tokens, $D_{IY_i,\overline{IY}}$ is a distance from an IY vowel token i to mean F1 and F2 values for vowel IY, $D_{AA_i,\overline{AA}}$ is a distance from an AA vowel token i to mean F1 and F2 values for vowel AA, and $D_{OW_i,\overline{OW}}$ is a distance from an OW vowel token i to mean F1 and F2 values for vowel OW.

41. The non-transitory computer-readable storage medium of claim 21, wherein one or more of the vowel space metrics are calculated based on a first vowel characteristic, formant F1, and a second vowel characteristic, formant F2;

wherein the vowel space metrics comprise an area of a vowel triangle defined by a mean F1 and F2 values of the AA, IY, and OW vowel sounds.

42. The non-transitory computer-readable storage medium of claim 41, wherein the area is calculated according to:

$$\text{area} = \sqrt{s(s-D_{\overline{IY},\overline{AA}})(s-D_{\overline{AA},\overline{OW}})(s-D_{\overline{OW},\overline{IY}})},$$

where $s = 0.5*(D_{\overline{IY},\overline{AA}} + D_{\overline{AA},\overline{OW}} + D_{\overline{OW},\overline{IY}})$, $\overline{V}$ represents mean F1 and F2 values for vowel V, and $D_{x,y}$ represents a Euclidean distance between two values in an F1-F2 plane:

$$D_{x,y} = \sqrt{(F1_x - F1_y)^2 + (F2_x - F2_y)^2}.$$

43. The non-transitory computer-readable storage medium of claim 21, wherein one or more of the vowel space metrics are calculated based on a first vowel space characteristic, formant F1, and a second vowel space characteristic, formant F2;

wherein the vowel space metrics comprise a within category vowel space dispersion.

44. The non-transitory computer-readable storage medium of claim 43, wherein the within category vowel space dispersion is calculated according to:

$$\text{dispersion} = \frac{1}{3} * \left( \frac{\sum D_{IY_i,\overline{IY}}}{N_{IY}} + \frac{\sum D_{AA_i,\overline{AA}}}{N_{AA}} + \frac{\sum D_{OW_i,\overline{OW}}}{N_{OW}} \right),$$

where $N_{IY}$ is a number of IY vowel tokens, $N_{AA}$ is a number of AA vowel tokens, $N_{OW}$ is a number of OW vowel tokens, $D_{IY_i,\overline{IY}}$ is a distance from an IY vowel token i to mean F1 and F2 values for vowel IY, $D_{AA_i,\overline{AA}}$ is a distance from an AA vowel token i to mean F1 and F2 values for vowel AA, and $D_{OW_i,\overline{OW}}$ is a distance from an OW vowel token i to mean F1 and F2 values for vowel OW.

\* \* \* \* \*